United States Patent [19]

Shiohara et al.

[11] Patent Number: 5,577,570
[45] Date of Patent: Nov. 26, 1996

[54] WIND INTRODUCING SYSTEM FOR MOTORCYCLE

[75] Inventors: Masakazu Shiohara; Shoichi Kubo, both of Iwata, Japan

[73] Assignee: Yamaha Hatsudoki Kabushiki Kaisha, Iwata, Japan

[21] Appl. No.: 964,447

[22] Filed: Oct. 21, 1992

[30] Foreign Application Priority Data

Apr. 9, 1992 [JP] Japan ................................ 4-118044

[51] Int. Cl.$^6$ .................................................. B60K 11/04
[52] U.S. Cl. .......................................... 180/219; 180/68.1
[58] Field of Search ................................ 180/219, 229, 180/68.1, 68.3

[56] References Cited

U.S. PATENT DOCUMENTS

| | | | |
|---|---|---|---|
| 4,577,720 | 3/1986 | Hamane et al. | 180/229 |
| 4,678,223 | 7/1987 | Kishi et al. | 180/219 X |
| 4,685,530 | 8/1987 | Hara | 180/219 |
| 4,703,825 | 11/1987 | Mikami et al. | 180/219 X |
| 4,709,774 | 12/1987 | Saito et al. | 180/229 |
| 4,830,135 | 5/1989 | Yamashita | 180/229 |
| 4,964,484 | 10/1990 | Buell | 180/219 |
| 4,982,973 | 1/1991 | Saito et al. | 180/229 X |
| 5,012,883 | 5/1991 | Hiramatsu | 180/219 X |

FOREIGN PATENT DOCUMENTS

| | | |
|---|---|---|
| 61-205573 | 9/1986 | Japan. |
| 62-43993 | 3/1987 | Japan. |
| 2-123485 | 10/1990 | Japan. |

Primary Examiner—Kevin Hurley
Attorney, Agent, or Firm—Knobbe, Martens, Olson & Bear

[57] ABSTRACT

A motorcycle arrangement having a frame with an integral air inlet device that takes ram air and delivers it to the engine induction system. The frame air inlet device includes an enlarged portion that encircles components of the front wheel suspension so as to provide a large flow volume without interfering with the steering of the motorcycle. In one embodiment of the invention the air inlet device is formed by tubular members that pass the sides of the front fork and have a sealing relationship with the remainder of the frame assembly. The air inlet device also includes a forwardly extending inlet portion that is adapted to mount an instrument in a forward location and which, in one embodiment, has an interfitting relationship with the body.

17 Claims, 8 Drawing Sheets

WIND INTRODUCING SYSTEM FOR MOTORCYCLE

BACKGROUND OF THE INVENTION

This invention relates to a wind introducing system for a motorcycle and more particularly to an improved system for delivering cool ram air to the induction system of a motorcycle.

As is well known, the extremely compact nature of a motorcycle or motorcycle type of vehicle gives rise to a number of design problems. One of these problems is the supply of adequate cool atmospheric air to the engine for its combustion. This problem is made more acute when the engine of a motorcycle is wholly or partially water cooled. The reason for this is that the radiator should be positioned in a forward location so that it will receive adequate air for engine cooling. This normally positions the radiator to the front of the induction system for the engine. As a result, the air drawn into the induction system is heated by the radiator and the volumetric efficiency and performance of the engine can be deteriorated.

In addition, it is now the practice with many forms of motorcycles to provide at least partial cowling so as to improve the wind resistance of the motorcycle and also to offer added comfort to the rider. The addition of external cowling further complicates the problem of providing adequate cool air to the engine induction system.

A number of arrangements have been proposed for providing ram air ducts that will supply air to the engine induction system. These ram air ducts have forwardly placed air inlets for conveying air from a forward position under ram effect back to the engine induction system. However, by providing such separate ducting the construction of the motorcycle becomes more difficult and servicing can become a problem. In addition, such separate ducts frequently do not provide adequate volume so as to insure unrestricted air flow to the engine under all running conditions even if a ram effect is generated.

Arrangements have been provided where the cowling of the motorcycle itself forms an air duct for the induction system or wherein the frame is formed as an air duct for the induction system. Where these constructions are employed, however, either the shape of the cowling and/or the frame does not afford adequate air flow.

It is, therefore, a principal object of this invention to provide an improved air inductions system for a motorcycle.

It is a further object of this invention to provide an improved air induction system for a motorcycle type of vehicle wherein adequate air flow can be provided and separate ducting is not required.

It is a further object of this invention to provide an improved motorcycle and air induction system.

An arrangement has been proposed wherein the motorcycle frame has formed an integral air introducing portion that has a forwardly extending air duct to which ram air is delivered for passing on to the engine for its operation. With such an arrangement, the portion of the frame in the vicinity of the head pipe and front fork is provided with areas that define openings so as to permit steering of the front fork and yet avoid a reduction of the volume of the air inlet device so as to provide adequate air flow. However, when such openings are formed, this can provide some difficulties in actually forming the frame portions that define the air inlet device.

It is, therefore, a still further object of this invention to provide an improved air induction system for a motorcycle type of vehicle wherein the frame is provided with an integral air inlet delivery portion having at least opening one opening through which a portion of the front fork assembly passes and which permits steering of the front wheel of the motorcycle without interference and wherein this opening is formed by a simple and highly effective manner that permits sealing.

Many times, as has been noted, it is desirable to provide a form of body cowling for the motorcycle to provide streamlining and rider comfort. Where the frame is provided with an integral air inlet portion, this body cowling must not interfere with the air inlet opening of the frame. In fact, it is desirable to provide an improved arrangement wherein the body cowling cooperates with the air inlet opening of the frame so as to assist in delivery to the engine.

It is, therefore, a further object of this invention to provide an improved motorcycle construction wherein the body cowling and frame cooperate to provide an effective air inlet device for delivering air to the engine.

Normally the frame of a motorcycle terminates at approximately the area of the head pipe. Since it is desirable to mount certain instruments for the motorcycle, these instruments are normally mounted either on the frame rearwardly of the head pipe, not always an ideal location, or must be mounted on separate extending brackets carried by the frame and positioned forwardly of the head pipe.

It is a further object of this invention to provide an improved frame air inlet device for a motorcycle type vehicle wherein the frame has a portion that extends forwardly to form an air inlet and which portion also has one or more instruments mounted upon it.

SUMMARY OF THE INVENTION

This invention is adapted to be embodied in a motorcycle type of vehicle having a frame assembly, at least one rear wheel carried by the frame assembly, an internal combustion engine supported by the frame assembly and driving the rear wheel, a front wheel and a front wheel suspension and steering arrangement for journaling the front wheel for rotation and for steering movement. The frame assembly includes an integral air delivery portion for delivering ram air to the engine. The air delivery portion of the frame is comprised of an atmospheric air inlet disposed in an area to receive high pressure air as the motorcycle is traveling and an air outlet for delivering air to the engine. The portion between the air inlet and the air outlet encircles a component of the front wheel suspension and steering arrangement for air flow there across without interfering with the steering of the front wheel. The encircling portion of the air inlet device is formed by a separate piece that defines an opening through which the component extends and may move, and upper and lower flange portions that are fixed to the frame and define a sealed area through which the air may flow.

Another feature of the invention is adapted to be embodied in a motorcycle of the type having a frame assembly, at least one rear wheel carried by the frame assembly, an internal combustion engine supported by the frame assembly and driving the rear wheel, and a front wheel journaled by the frame assembly for steering movement. The frame assembly includes an integral air delivery portion for delivering ram air to the engine. The air delivery portion of the frame is comprised of an atmospheric air inlet disposed forwardly of the front wheel steering connection to the frame assembly and which is surrounded by a protective body cowling. The body cowling defines an air inlet opening that is registry with the frame air inlet opening for delivering ram air to the frame air inlet opening.

Yet a further feature of the invention is also adapted to be embodied in a motorcycle type of vehicle having a frame assembly, at least one rear wheel carried by the frame assembly, an internal combustion engine supported by the frame assembly and driving the rear wheel, and a front wheel journaled for steering movement by the frame assembly. The frame assembly has an integral air delivery portion that extends forwardly of the steering connection to the front wheel with an atmospheric air inlet disposed in an area to receive high pressure air for ram delivery to the engine. In accordance with this feature of the invention, at least one instrument for the motorcycle is mounted on the forwardly extending part of the frame air delivery portion.

DETAILED DESCRIPTION OF THE PREFERRED EMBODIMENTS OF THE INVENTION

Figure 1:
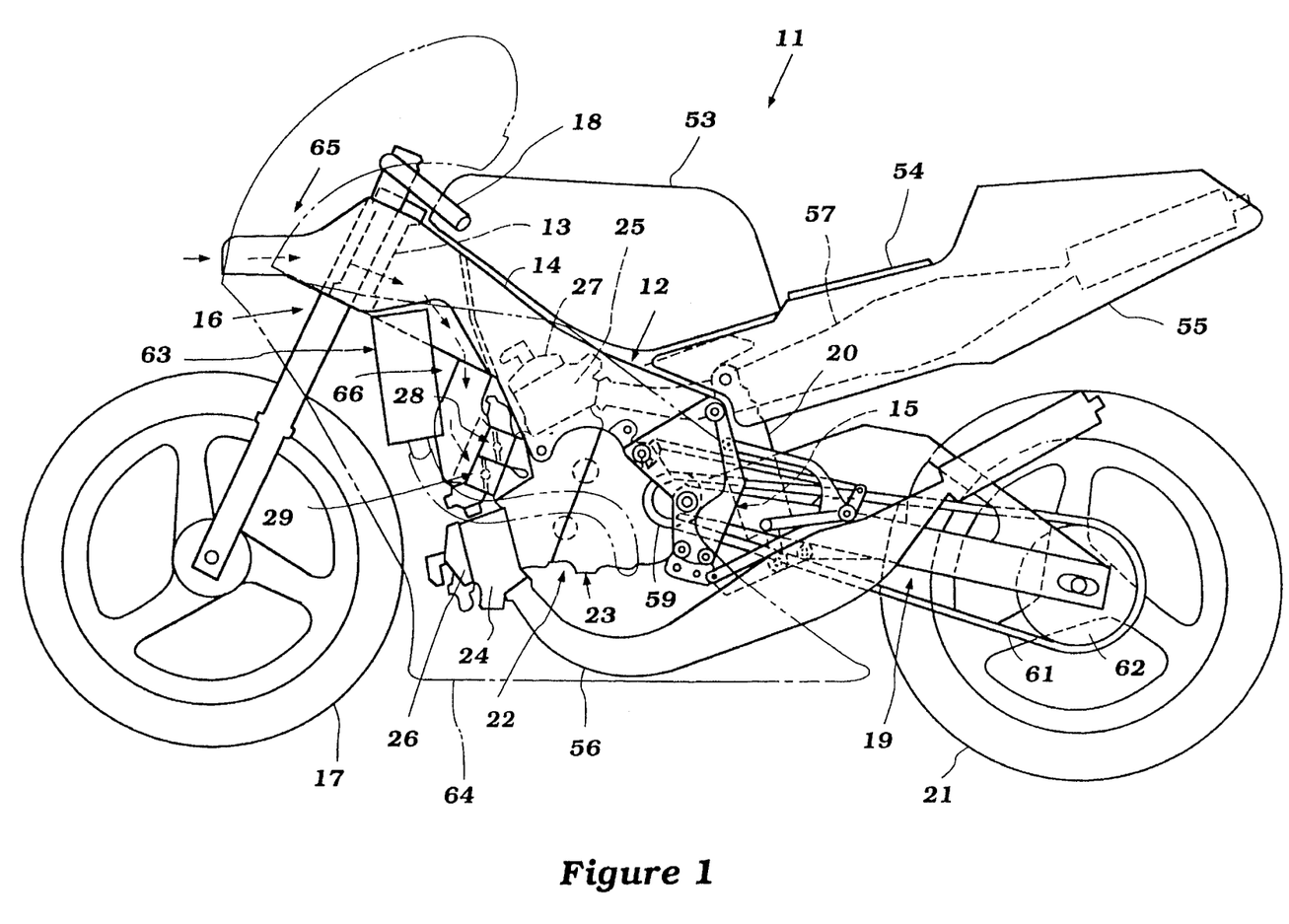
FIG. 1 is a side elevational view of a motorcycle constructed in accordance with an embodiment of the invention, with the body cowling shown in phantom to more clearly show the details of the construction.

Referring now in detail to the drawings and initially to FIG. 1, a motorcycle constructed in accordance with an embodiment of the invention is depicted and is identified generally by the reference numeral 11. The invention is particularly adapted for use in motorcycles or other vehicles of the motorcycle type. By "motorcycle type" reference is had to vehicles having a frame construction having a head pipe on which a front wheel is dirigibly supported. In addition to motorcycles per se, such vehicles may comprise three or four wheel off the road vehicles.

The motorcycle 11, as noted, has a frame assembly 12 that is comprised of a head pipe 13 and a pair of main frame members 14 which are affixed to the head pipe 13 and extend rearwardly and downwardly in a manner which will be described. At the rear end, these main frame members 14 are connected to a rear wheel suspension member 15 which may comprise a casting or weldment.

The head pipe 13 journals a front fork assembly 16 for steering movement about a generally vertically extending steering axis. A front wheel 17 is rotatably journaled at the lower end of the front fork assembly 16 and a handlebar assembly 18 is affixed to the upper end of the front fork assembly 16 for steering of the front wheel 17 in a known manner. If desired, the front fork assembly 16 may include a suspension arrangement for suspension travel of the front wheel 17 relative to the frame assembly 12.

A trailing arm 19 is pivotally connected at its front end to the rear suspension member 15 in a manner as described in the co-pending, application entitles"Motorcycle", Ser. No. 07/964,445, filed Oct. 21, 1992 and assigned to the assignee hereof now issued as U.S. Pat. 5,383,530 on Jan. 24, 1995. The disclosure of that application is incorporated herein by reference inasmuch as the invention to relates to the air flow system of the motorcycle 11. A rear wheel 21 is rotatably journaled at the rear end of the trailing arm assembly 19. A supension element 20 is interposed between the trailing arm 19 and the frame assembly 12 for cushioning the suspension movement of the rear wheel 21.

An internal combustion engine, indicated generally by the reference numeral 22 is mounted in the frame assembly 12 in a known manner. In the illustrated embodiment, the engine 22 is of the V4, two-cycle, crankcase compression type and includes a crankcase member 23 from which a pair of cylinder banks 24 and 25 extend. Cylinders head 26 and 27 are affixed to the cylinder banks 24 and 25. The cylinder bank 24 is inclined at a slight downward angle to the horizontal while the cylinder bank 25 is inclined slightly forwardly to the vertical.

An induction system is provided for the engine 22 with the intake charge being inducted into the crankcase chambers of the engine 22, as is typical with two-cycle engine practice. This induction system includes a pair of upper throttle bodies 28 and a pair of lower throttle bodies 29 having a configuration as best seen in FIG. 2.

Figure 2:
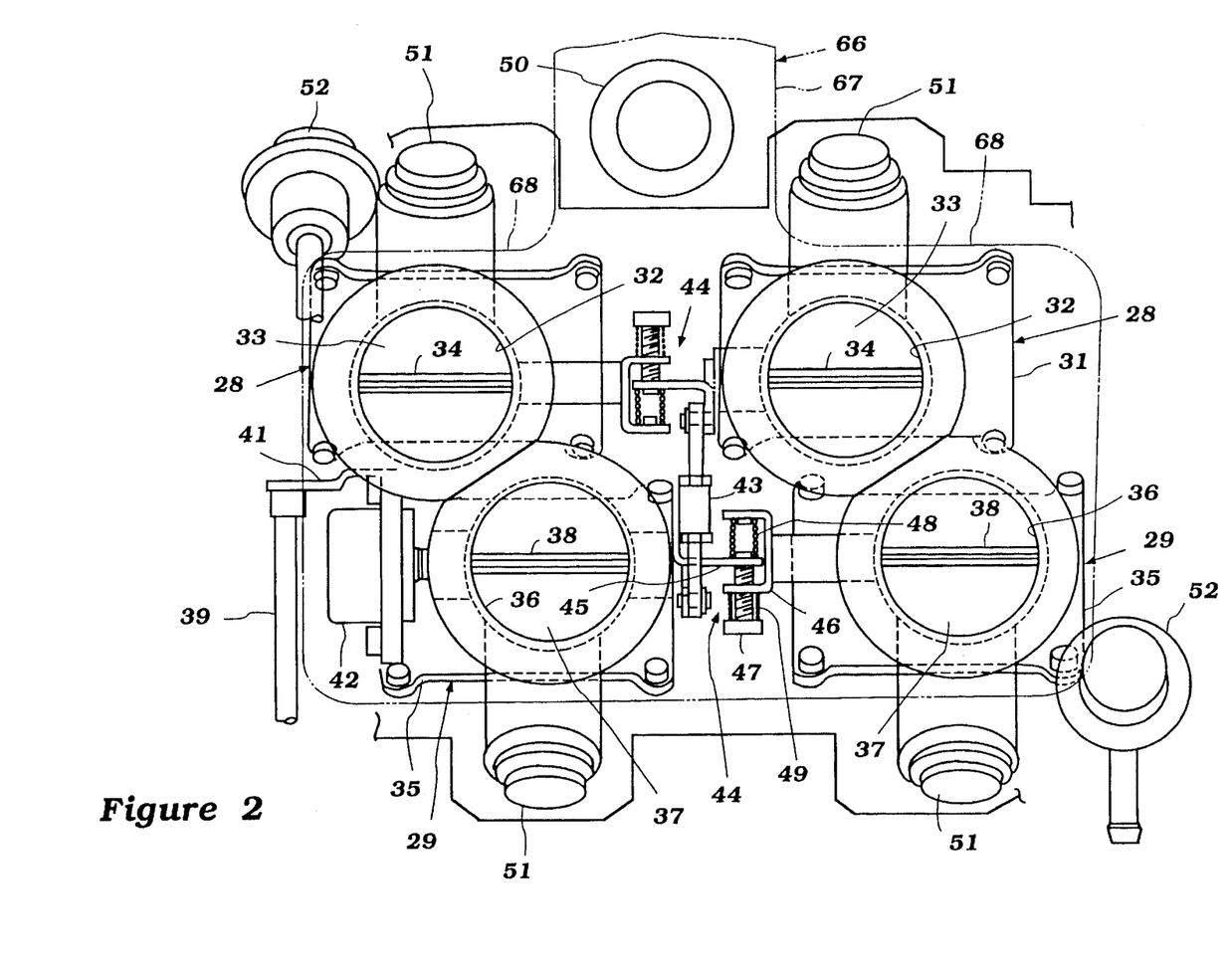
FIG. 2 is an enlarged front elevational view showing the throttle body arrangement for the induction system.

Referring specifically to FIG. 2, it will be seen that the upper throttle bodies 28 comprise mounting bases 31 that have upwardly extending trumpets or intakes 32. Throttle valves 33 are positioned within the air intake on respective throttle valve shafts 34. In a similar manner, the lower throttle bodies 29 comprise mounting flanges 35 that are affixed to the crankcase member 23 and which define air trumpets or inlets 36 in which throttle valves 37 are supported upon throttle valve shafts 38.

A throttle cable 39 is affixed at its remote end (not shown) to a suitable throttle actuator and operates a throttle control lever 41 that is fixed to one of the throttle valve shafts 39 of the lower throttle bodies 29. A throttle valve position sensor 42 cooperates with the lever 41 for providing a signal to an ECU for controlling the fuel supply to the engine and for other controls, as may be desired.

An adjustable link 43 connects the opposite end of the throttle valve shaft 38 operated by the cable 39 with one of the throttle valve shafts 34 of the upper throttle bodies 28. In the illustrated embodiment, this connection is to the opposite side upper throttle body 28 with the adjustable link 43 permitting synchronization between the throttle valve shafts 38 and 34 so interlinked.

Synchronizing mechanisms, indicated generally by the reference numeral 44 are interposed between the remaining two throttle valve shafts 34 and 38 of the upper and lower throttle bodies 28 and 29 so as to connect them and synchronize them. Each throttle synchronizing mechanism 44 includes a lever 45 that is affixed to the directly operated throttle valve shaft 38 or 34 and which has a tang that extends between a bifurcated lever 46 that is affixed to the other throttle valve shaft 38 or 34 of the respective pair. An adjusting screw 47 is threaded through one leg of the lever 46 and adjustably urges the tang of the lever 46 into engagement with a coil compression spring 48 so as to establish the desired relative positions of the throttle valve shafts of the pairs. A coil spring 49 also encircles the adjusting screw 47 to hold it in place so that it will not move under vibration.

In the illustrated embodiment, the engine 22 is also provided with a port type fuel injection system and for that purpose there are provided fuel injectors 51 which inject into the induction passages 33 or 36 of the respective lower and upper throttle bodies 29 and 28. Fuel is supplied to the fuel injectors 51 from a fuel tank, which will be described, by a pump 50 through a system that includes a pair of pressure regulators 52 for regulating the pressure of fuel supplied to the fuel injectors 51.

Referring again to FIG. 1, the fuel tank is illustrated and is identified by the reference numeral 53. The fuel tank 53 is mounted above the engine 22 and rearwardly of the head pipe 13. A seat 54 is mounted on a side cover 55 which, in turn, mounted in a suitable manner on the frame 12 rearwardly of the fuel tank 13.

A pair of lower exhaust pipes and exhaust systems 56 extend from the exhaust ports of the lower cylinder banks 24 and pass rearwardly along opposite sides of the frame and terminate at upwardly extending mufflers that discharge on opposite sides of the trailing arm 19. In a similar manner, a pair of upper exhaust pipes 57 extend rearwardly from the exhaust ports of the upper cylinder banks 25 and extend on opposite sides of the side cover 55 and terminate in muffler atmospheric exhaust discharges.

As is typical with motorcycle practice, the crankcase 23 of the engine 22 also encloses a change speed transmission as described in the aforenoted co-pending application which drives a stub output shaft 58 (FIG. 3) which, in turn, has affixed to its exposed end a driving sprocket 59. Referring again to FIG. 1, this driving sprocket 59 drives a chain 61 which, in turn, drives a driven sprocket 62 affixed to the rear wheel 21 for driving the rear wheel 21.

The engine 22 is at least partially water cooled and is provided with a pair of radiators 63 that are mounted in the frame in an appropriate manner on opposite sides of the front fork 16 so as to receive unobstructed air flow for cooling purposes. A cowling or body, shown in phantom and identified by the reference numeral 64 is provided for streamlining purposes and may be formed with appropriate air inlet openings so that cooling air may flow to the radiators 63.

Although this system provides effective cool air for the radiators 63, the positioning of the radiators 63 in front of the forwardly facing throttle bodies 28 and 29 will mean that heated air will be delivered to the throttle bodies 28 and 29 and decrease the volumetric efficiency and performance of the engine 22. To avoid this, there is provided an air intake system comprised of an integral frame air inlet, indicated generally by the reference numeral 65 which delivers cool ram air to an air inlet device 66 which, in turn, supplies this cool ram air to the throttle bodies 28 and 29. As may be seen in FIG. 2, the air inlet device 66 has an upwardly extending inlet portion 67 which communicates in a manner to be described with the frame air inlet 65 and a lower box like portion 68 that is affixed to and encircles the throttle bodies 28 and 29. If desired, an air filter (not shown) may be positioned within the air inlet device 66.

Figure 3:
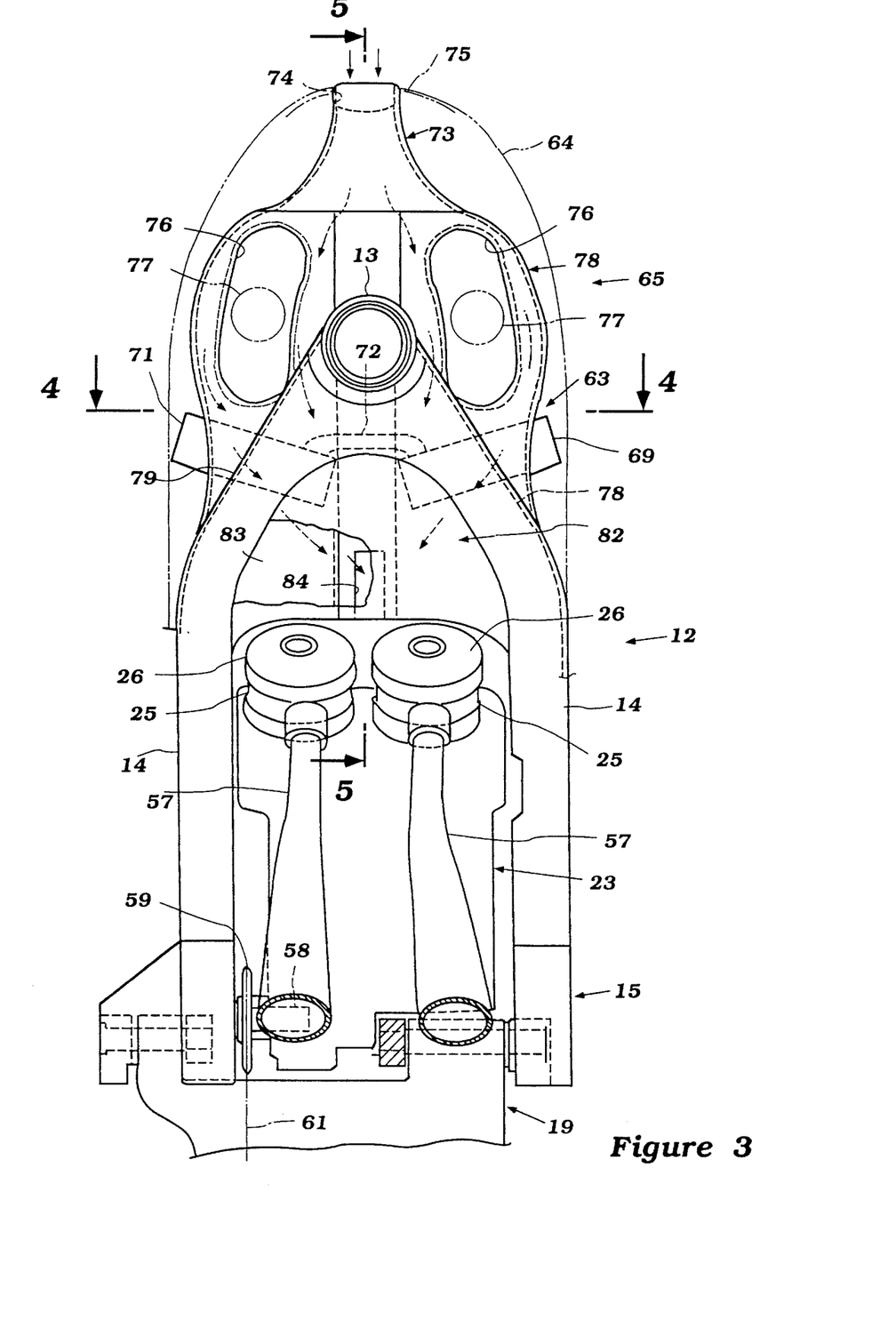
FIG. 3 is a top plan view of the motorcycle, with certain components removed and other components shown in phantom to more clearly show the construction.
Figure 4:
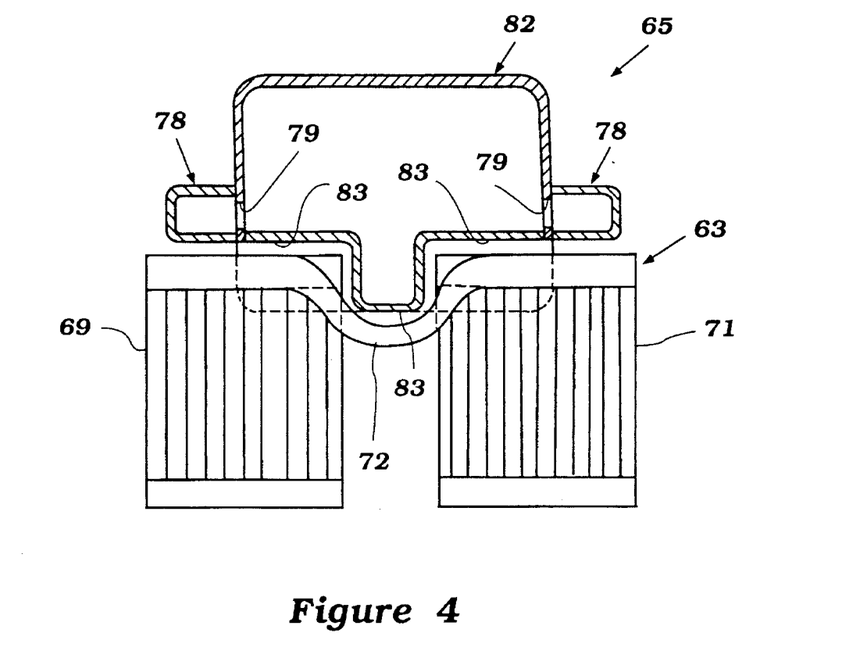
FIG. 4 is a cross sectional view taken along the line 4—4 of FIG. 3.
Figure 5:
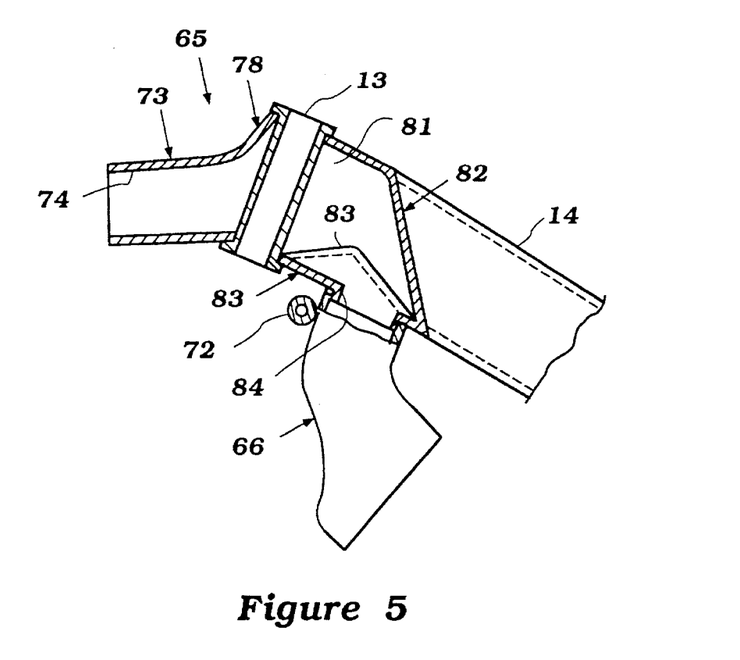
FIG. 5 is a cross sectional view taken along the line 5—5 of the FIG. 3.

The frame air inlet device 65 and the way in which it delivers air to the air inlet device 66 will now be described by particular reference to FIGS. 3 through 5. In FIGS. 3 and 4, the radiators 63 are shown in more detail and comprise a pair of radiators, as noted, which are indicated by the reference numerals 69 and 71 which are illustrated as being of the vertical flow type and which have their upper header tanks connected by a conduit 72. The lower header tanks are connected to the cooling system of the engine in an appropriate manner.

The air intake device 65 is of a welded construction and is comprised of an air inlet portion 73 that extends forwardly of the head pipe 13 and which has a forwardly facing air inlet opening 74 which extends through a corresponding opening 75 in the body cowling 64 so as to receive ram air as shown by the arrows in FIG. 3. It will be noted that the air inlet portion 73 increases in cross sectional area from the opening 74 in a rearward direction and then flares out into a pair of sections which define generally arcuate or elliptical shaped openings 76 which pass side portions 77 of the front fork assembly 16 so as to permit steering motion without interference from the air intake device 65. In this area, the air intake device also extends around the head pipe 13 and forms an enlarged intermediate portion 78 in which the openings 76 are formed. As a result of this enlargement in the volume, there will be no flow restrictions and, furthermore, the air may flow around the head pipe 13 and fork portions 77 so as to provide substantially unrestricted and free air flow back toward the induction system.

The main frame members 14 have a generally channel shape and their forward ends are formed with enlarged openings 79 which face in the direction of air flow so that the ram air will flow through these openings 79 and into a further air outlet chamber 81 that is formed by the main frame members 14 and a closure plate 82 that extends across them and defines the air outlet portion 81. A lower wall 83 is formed by the lower flanges of the main frame members 14 and the closure plate 82 so that the ram air which has entered the outlet opening 81 will be collected in this area. A discharge duct 84 is formed in this lower wall and the air inlet device is fitted around a flange formed by the discharge duct 84 so as to provide a good air seal and to deliver the ram air downwardly into the air inlet device 66 and to the throttle bodies 28 and 29.

It should be readily apparent from this description that the device is very effective in providing copious amounts of ram air that has not been heated by the radiator 63 for efficient operation of the engine 22. Also, the device is constructed in such a way that the front fork and steering mechanism is partially encircled but so that it does not in any way interfere with the air flow into the induction system.

In the embodiment of the invention as thus far described, it should be readily apparent that the air inlet device 65 and particularly its openings 76 which pass the front fork portions 77 must be configured so as to permit a relatively air tight construction. This can give rise to difficulties in fabrication to insure that the openings 76 are effectively sealed. FIGS. 6 through 9 show another embodiment of the invention wherein these openings can be formed in an easy manner and which permits effective sealing and low cost construction. In addition to this difference, this embodiment also incorporates an arrangement wherein the body cowling 64 cooperates with the air inlet portion 73 so as to provide a forwardly extended air inlet opening and one which will insure against any leakage of air between the body cowling 64 and the inlet portion 73. In addition, this embodiment shows an arrangement wherein the inlet device 65 serves an additional purpose, as will become readily apparent.

These figures also show in more detail the construction of the front fork assembly 16, how it is connected to the handlebar assembly 18 and how it is mounted in the head pipe 13 and this construction will be described by particular reference to FIGS. 6, 7 and 9 and may be considered to be the same as that in the previously described embodiment, which has not been shown in such full detail. It should be noted that the handlebar assembly 18 is affixed to the front fork 16 between an upper bracket 101 and a lower bracket 102 which brackets are, in turn, affixed to the front fork side members 77 in any suitable manner. The handlebar assembly 18 is affixed closer to the upper bracket 101 and is positioned slightly above the air intake portion 73 of the air inlet device 65. The upper and lower brackets 101 and 102 are, in turn, affixed to a steering shaft 103 which is journaled within an inner member 104 that is affixed to an outer sleeve 105 of the head pipe 13. Upper and lower bearings 106 journal this steering shaft for the aforenoted steering movement.

Figure 9:
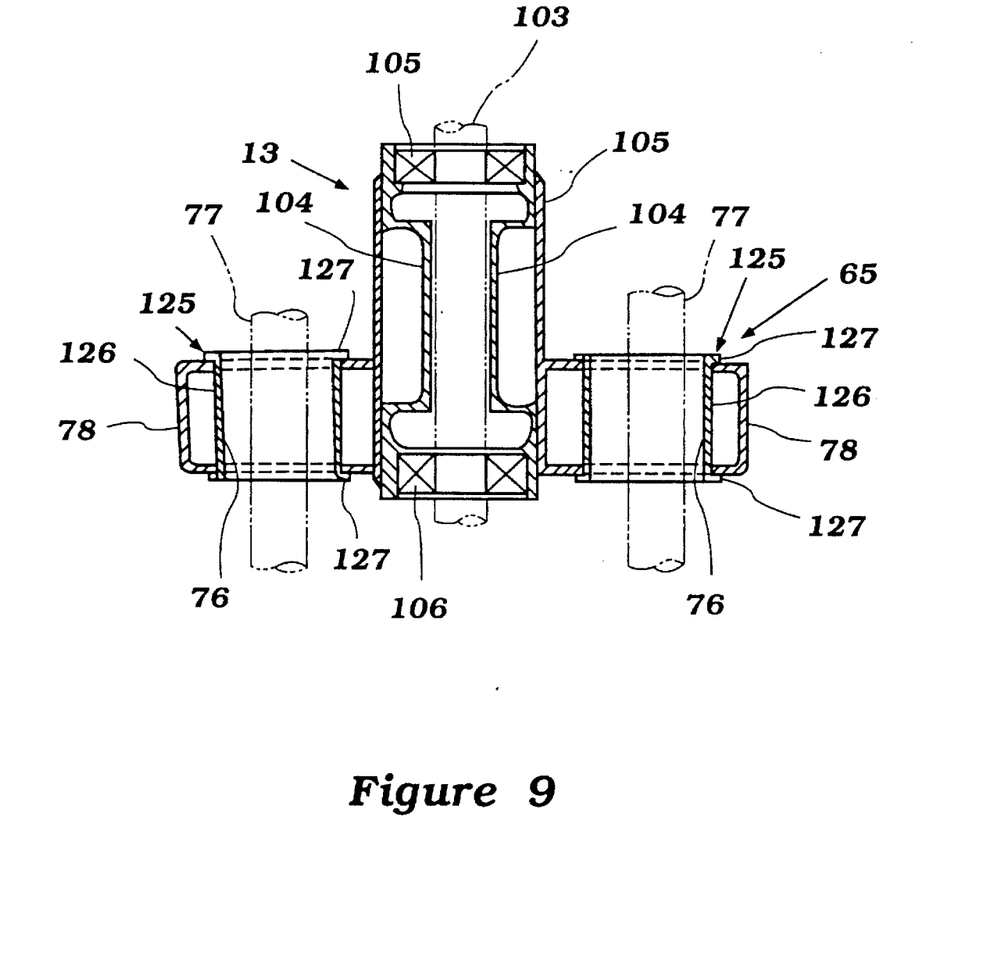
FIG. 9 is a cross sectional view taken along the line 9—9 of FIG. 7.

It should be noted that in this embodiment, unlike the previously described embodiment, the head pipe and particularly the outer sleeve 105 extends vertically above the side portions 78 of the air inlet device (FIG. 9). This permits the handlebar assembly 18 to be positioned relatively low, as seen in FIG. 7, in a racing type posture without interfering with the enlarged portion 78 of the air inlet device and also without restricting the flow area of the air inlet device.

A shimmy damper, indicated generally by the reference numeral 107 is provided for reducing steering vibrations and this shimmy damper has a housing that is formed with a lug 108 that is pivotally connected to a lug 109 of the lower bracket 102 by a pivot pin 111. The piston rod of the shimmy damper 107 has a trunnion 112 that is connected to a further lug 113 formed on enlarged portion 78 of the air inlet device 65. The shimmy damper 107 operates in a well known manner.

It should be noted that in this embodiment, the inlet device inlet opening 74 is positioned rearwardly of the front body cowling 64. The front body cowling 64 is defined with an opening 114 that has a flange portion 115 that forms a seal with the outer periphery of the air inlet portion 73 of the air inlet device 65 so as to insure an air tight seal and the absence of any leakage around the area between the body cowling 64 and the air inlet device 65.

Figure 7:
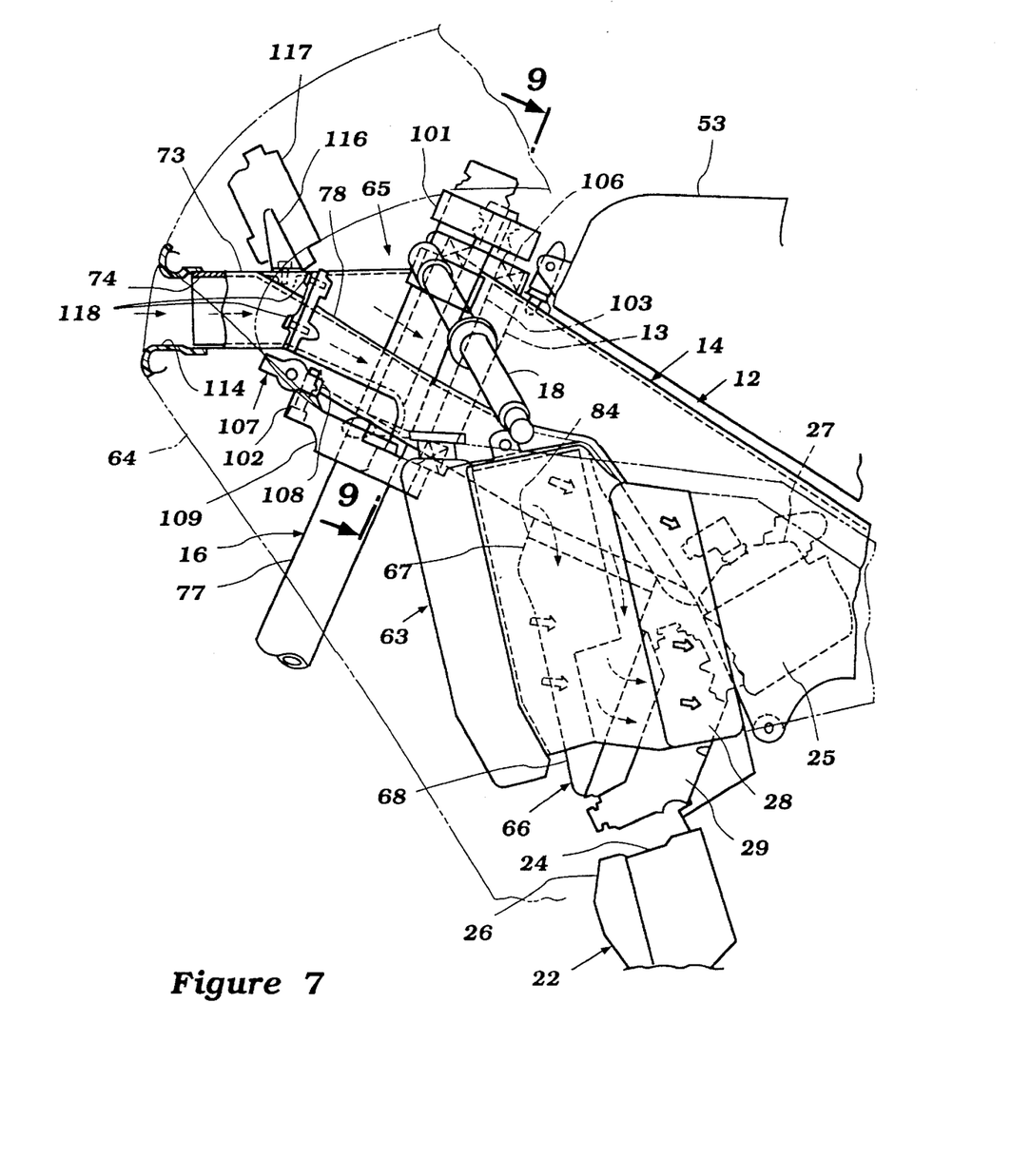
FIG. 7 is a side elevational view of the portion of the construction shown in FIG. 6.
Figure 8:
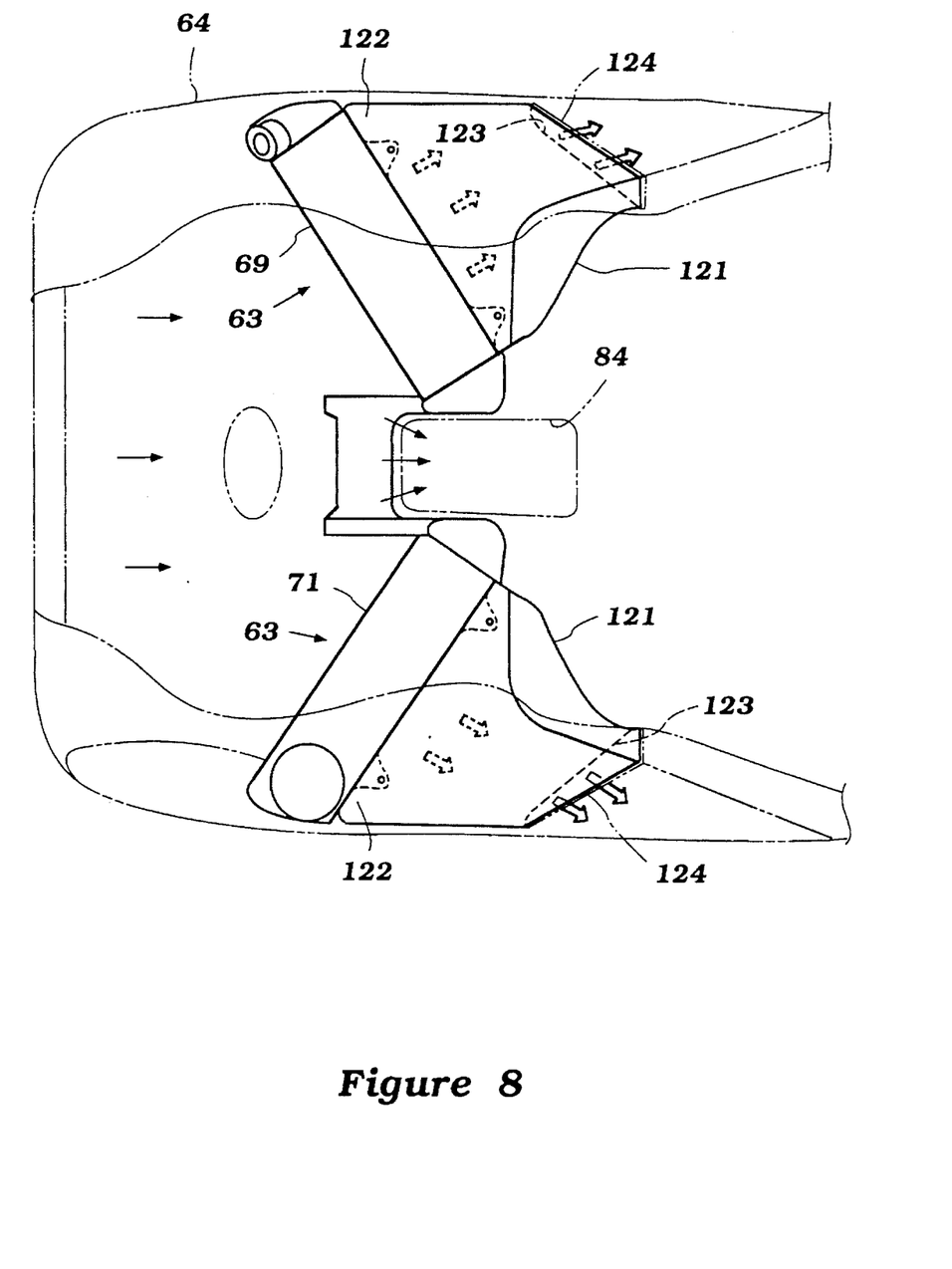
FIG. 8 is a top plan view, in part similar to FIG. 6, but shows how the air flow through the system occurs.

In accordance with a feature of the invention, the air inlet device 65 and specifically its air inlet portion 73 that extends forwardly of the head pipe 13 mounts a mounting bracket 116 (FIG. 7, on which an instrument 117 such as a tachometer, speedometer or group of instruments may be mounted. This places the instruments in a well viewed position and one forwardly of that which would be provided by conventional frame constructions.

Figure 6:
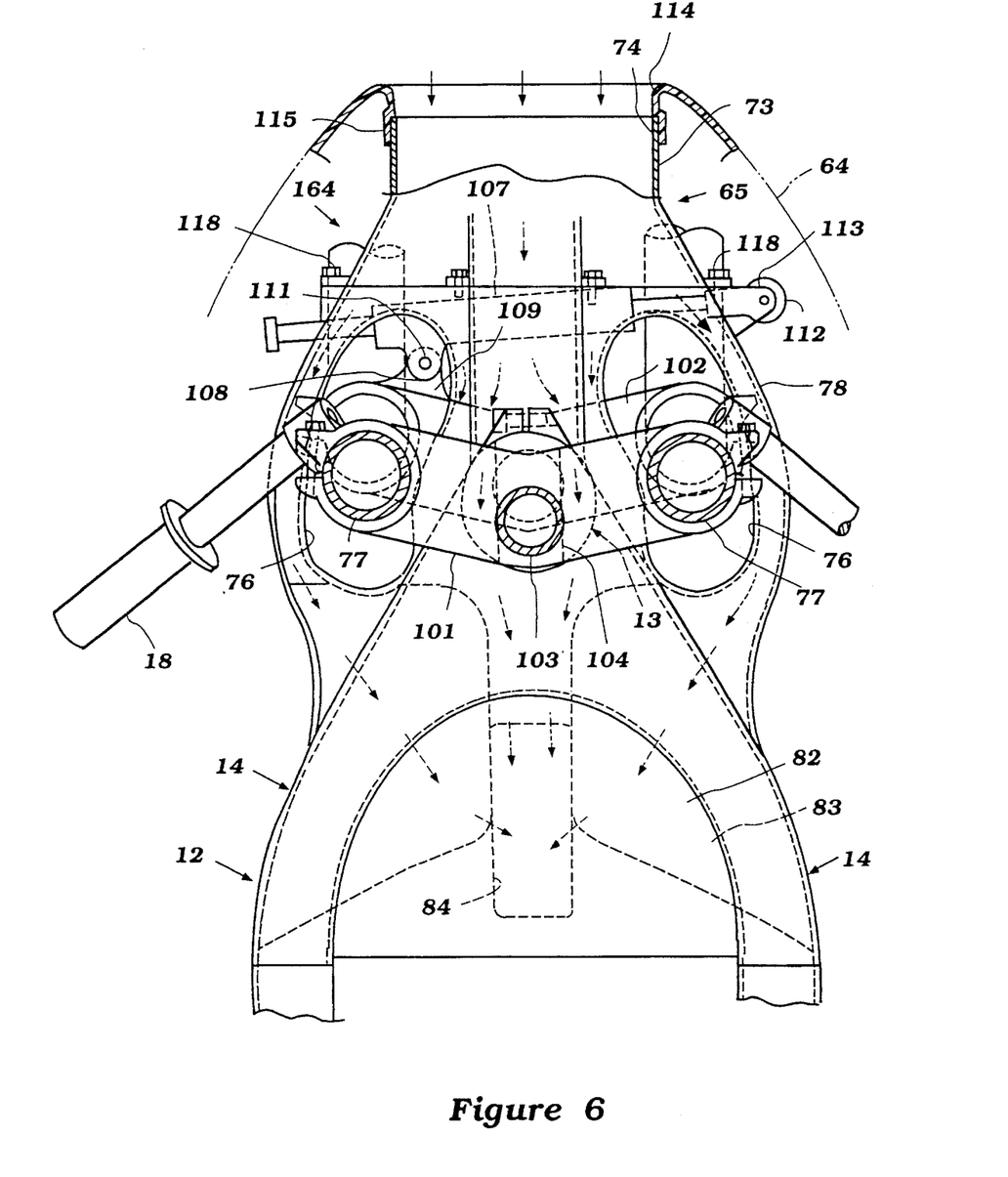
FIG. 6 is a top plan view, in part similar to FIG. 3, of another embodiment of the invention, with portions shown in phantom, other portions broken away and some portions removed to more clearly show the construction.

It should also be noted that in this embodiment, the air inlet portion 73 of the device 65 is formed as a separate piece from the enlarged portion 78 but is affixed rigidly to it by the threaded fasteners 118 as clearly seen in FIGS. 6 and 7.

This embodiment also shows the way in which the air flow across the radiators 63 and specifically the separate radiators 69 and 71 may be accomplished. The air is drawn through the body cowling 64 in an appropriate manner and then flows through the individual radiators 69 and 71. Exit ducts 121 (FIG. 8) are affixed to the body cowling portion 64 in an appropriate manner and have inlet portions 122 that mate with the rear surfaces of the radiators 69 and 71 and outlet openings 123 which register with outlet openings 124 formed in the body cowling 64 rearwardly of the induction system for the engine.

FIG. 9 shows how the openings 96 are formed. This is done by providing separate pieces, indicated generally by the reference numeral 125, which have tubular portions 126 that define the openings 76 and flanged ends 127 that over-lie the upper and lower surfaces of the frame portion 78 and which are affixed thereto, as by welding so as to provide an effective seal. In this way, the construction can be quite simple and nevertheless very effective.

It should be understood that the foregoing description is that of preferred embodiments of the invention and that various changes and modifications may be made without departing from the spirit and scope of the invention, as defined by the appended claims.

We claim:

1. A motorcycle type of vehicle having a frame assembly, at least one rear wheel carried by said frame assembly, an internal combustion engine supported by said frame assembly and driving said rear wheel, a front wheel, and a front wheel suspension and steering arrangement for journaling said front wheel for rotation and for steering movement, said frame assembly including an integral air delivery portion for delivering ram air to said engine, said air delivery portion being comprised of an atmospheric air inlet disposed in an area to receive high pressure air as said motorcycle is traveling, an air outlet for delivering said air to said engine, and a portion between said air inlet and said air outlet completely encircling a component of said front wheel suspension and steering arrangement for air flow there around without interfering with the steering of said front wheel, said portion being formed by a tubular part through which said component passes and flanges at ends of said tubular part affixed to the remainder of said frame assembly.

2. A motorcycle type of vehicle as set forth in claim 1 wherein the front wheel suspension and steering arrangement includes a head pipe formed by the frame assembly and a front fork supported for steering movement by said head pipe.

3. A motorcycle type of vehicle as set forth in claim 2 wherein the portion of the air delivery portion encircles the front fork.

4. A motorcycle type of vehicle as set forth in claim 3 wherein the front fork has a pair of spaced apart sections.

5. A motorcycle type of vehicle as set forth in claim 4 wherein both of the spaced apart sections of the front fork are encircled by tubular parts of the portion of the air delivery portion.

6. A motorcycle type of vehicle as set forth in claim 5 wherein the head pipe is also encircled by the portion of the air delivery portion.

7. A motorcycle type of vehicle as set forth in claim 6 wherein the head pipe extends vertically above the portion of the air delivery portion so as to permit the handlebar assembly to be positioned low in a racing position.

8. A motorcycle type of vehicle as set forth in claim 2 further including a cowling assembly extending forwardly of the head pipe.

9. A motorcycle type of vehicle as set forth in claim 8 wherein the cowling assembly is provided with an opening in registry with the air inlet of the air delivery portion of the frame.

10. A motorcycle type of vehicle as set forth in claim 9 wherein the cowling assembly opening is defined by a flange that interlocks with the air inlet of the air delivery portion of the frame.

11. A motorcycle type of vehicle as set forth in claim 10 wherein the air inlet extends forwardly of the head pipe.

12. A motorcycle type of vehicle as set forth in claim 11 further including an instrument mounted on the forwardly extending portion of the air delivery portion.

13. A motorcycle type of vehicle having a frame assembly, at least one rear wheel carried by said frame assembly, an internal combustion engine supported by said frame assembly and driving said rear wheel, a front wheel, and a front wheel suspension and steering arrangement for journaling said front wheel for rotation and for steering movement, said frame assembly including an integral air delivery portion for delivering ram air to said engine, said air delivery portion being comprised of an atmospheric air inlet disposed in an area to receive high pressure air as said motorcycle is traveling, an air outlet for delivering said air to said engine, and a body cowling encircling a portion of said motorcycle and having an opening aligned with said atmospheric air inlet of said air delivery portion, said body cowling and said air inlet of said air delivery portion having interlocking portions.

14. A motorcycle type of vehicle as set forth in claim 13 wherein the air inlet extends forwardly of the front wheel suspension and steering arrangement.

15. A motorcycle type of vehicle as set forth in claim 14 further including an instrument mounted directly on the air inlet.

16. A motorcycle type of vehicle having a frame assembly at least one rear wheel carried by said frame assembly, an internal combustion engine supported by said frame assembly and driving said rear wheel, a front wheel, and a front wheel suspension and steering arrangement including a front fork for journaling said front wheel for rotation and for steering movement, said frame assembly including an integral air delivery portion for delivering ram air to said engine, said air delivery portion being comprised of an atmospheric air inlet disposed forwardly of said front fork and in an area to receive high pressure air as said motorcycle is traveling, an air outlet for delivering said air to said engine, and an instrument mounted directly on said air inlet and forwardly of said front fork.

17. A motorcycle type of vehicle comprising a frame assembly comprised of a head pipe and a pair of main frame members extending rearwardly from said head pipe, at least one rear wheel carried by said frame assembly, an internal combustion engine supported by said frame assembly and driving said rear wheel, a front wheel, and a front wheel suspension and steering arrangement for journaling said front wheel for rotation and for steering movement about an axis defined by said head pipe, said frame assembly including an integral air delivery portion for delivering ram air to said engine comprised of an atmospheric air inlet disposed in an area to receive high pressure air as said motorcycle is traveling and forwardly of said head portion, an air outlet for delivering air to said engine, and an intermediate portion completely surrounding said head pipe, said intermediate portion being positioned at a lower level than said head pipe for permitting a handlebar assembly to be affixed to said front wheel suspension and steering arrangement and pass over said intermediate portion without restricting the air flow area of said intermediate portion.

\* \* \* \* \*